United States Patent
Cabrera et al.

(10) Patent No.: US 9,742,794 B2
(45) Date of Patent: *Aug. 22, 2017

(54) METHOD AND APPARATUS FOR AUTOMATING THREAT MODEL GENERATION AND PATTERN IDENTIFICATION

(71) Applicant: Intuit Inc., Mountain View, CA (US)

(72) Inventors: Luis Felipe Cabrera, Bellevue, WA (US); M. Shannon Lietz, San Marcos, CA (US); Javier Godinez, Bonita, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/086,330

(22) Filed: Mar. 31, 2016

(65) Prior Publication Data

US 2016/0248798 A1     Aug. 25, 2016

Related U.S. Application Data

(63) Continuation of application No. 14/288,260, filed on May 27, 2014, now Pat. No. 9,330,263, and a
(Continued)

(51) Int. Cl.
*H04L 29/06*     (2006.01)
*G06F 21/57*     (2013.01)

(52) U.S. Cl.
CPC ........ *H04L 63/1433* (2013.01); *G06F 21/577* (2013.01); *H04L 63/1425* (2013.01)

(58) Field of Classification Search
CPC ............. H04L 63/1433; H04L 63/1425; G06F 21/577
(Continued)

(56) References Cited

U.S. PATENT DOCUMENTS 5,712,641 A    1/1998   Casabona et al.
5,731,991 A    3/1998   Kinra et al.
(Continued)

FOREIGN PATENT DOCUMENTS

CN           101374051        2/2009
EP             2 541 420         1/2013
WO         WO 02/091182     11/2002
WO         WO 2009/079648    6/2009
WO         WO 2012/023657    2/2012
(Continued)

OTHER PUBLICATIONS

Schwarzkopf et al., "Increasing Virtual Machine Security in Cloud Environments," *Journal of Cloud Computing: Advances, Systems and Applications*, Jul. 2012, pp. 1-12.
(Continued)

*Primary Examiner* — Hadi Armouche
*Assistant Examiner* — Angela Holmes
(74) *Attorney, Agent, or Firm* — Hawley Troxell Ennis & Hawley LLP; Philip McKay

(57) ABSTRACT

A method and system for automating threat model generation and pattern identification for an application includes identifying components of an application, and receiving security information that identifies whether security measures were implemented within the application to secure the application against security threats. The method further receives an identification of external events, and receiving first patterns from one or more first virtual assets. A database is populated with the first patterns and the external events and then second patterns are received and compared to the first patterns. The method and system include distributing the identification of the one of the external events to the one or more second virtual assets, if the second patterns are similar to the first patterns, according to one embodiment.

32 Claims, 4 Drawing Sheets

Related U.S. Application Data continuation of application No. 14/448,405, filed on Jul. 31, 2014.

(58) Field of Classification Search
USPC .......................................................... 726/22
See application file for complete search history.

(56) References Cited

U.S. PATENT DOCUMENTS

| | | |
|---|---|---|
| 6,085,224 A | 7/2000 | Wagner |
| 6,202,066 B1 | 3/2001 | Barkley et al. |
| 6,205,552 B1 | 3/2001 | Fudge |
| 6,343,236 B1 | 1/2002 | Gibson et al. |
| 6,549,932 B1 | 4/2003 | McNally et al. |
| 6,651,183 B1 | 11/2003 | Gensler et al. |
| 7,114,183 B1 | 9/2006 | Joiner |
| 7,228,438 B2 | 6/2007 | Bushmitch et al. |
| 7,296,261 B2 | 11/2007 | Witchel et al. |
| 7,373,524 B2 | 5/2008 | Motsinger et al. |
| 7,426,745 B2 | 9/2008 | McCarty |
| 7,437,764 B1 | 10/2008 | Sobel et al. |
| 7,506,371 B1 | 3/2009 | Ben-Natan |
| 7,552,424 B1 | 6/2009 | Bischof et al. |
| 7,574,746 B2 | 8/2009 | Hill et al. |
| 7,577,722 B1 | 8/2009 | Khandekar et al. |
| 7,640,458 B2 | 12/2009 | Rao et al. |
| 7,761,923 B2 | 7/2010 | Khuti et al. |
| 7,779,247 B2 | 8/2010 | Roegner |
| 7,788,235 B1 | 8/2010 | Yeo |
| 7,792,256 B1 | 9/2010 | Arledge et al. |
| 7,831,570 B2 | 11/2010 | Sack et al. |
| 7,925,527 B1 | 4/2011 | Flam |
| 7,925,923 B1 | 4/2011 | Hyser et al. |
| 7,944,355 B2 | 5/2011 | Kumar et al. |
| 7,996,836 B1 | 8/2011 | McCorkendale et al. |
| 8,001,422 B1 | 8/2011 | Sun et al. |
| 8,095,962 B1 | 1/2012 | Condon |
| 8,108,855 B2 | 1/2012 | Dias et al. |
| 8,132,231 B2 | 3/2012 | Amies et al. |
| 8,161,475 B2 | 4/2012 | Araujo et al. |
| 8,171,485 B2 | 5/2012 | Muller |
| 8,171,554 B2 | 5/2012 | Elovici et al. |
| 8,181,036 B1 | 5/2012 | Nachenberg |
| 8,281,399 B1 | 10/2012 | Chen et al. |
| 8,312,516 B1 | 11/2012 | Malatesta |
| 8,327,373 B2 | 12/2012 | Srinivasan |
| 8,341,625 B2 | 12/2012 | Ferris et al. |
| 8,347,281 B2 | 1/2013 | Arsenault et al. |
| 8,438,643 B2 | 5/2013 | Wiemer et al. |
| 8,510,821 B1 | 8/2013 | Brandwine et al. |
| 8,555,388 B1 | 10/2013 | Wang et al. |
| 8,561,126 B2 | 10/2013 | Ananthanarayanan et al. |
| 8,561,127 B1 | 10/2013 | Agrawal et al. |
| 8,572,733 B1 | 10/2013 | Rockwood |
| 8,615,785 B2 | 12/2013 | Elrod et al. |
| 8,621,618 B1 | 12/2013 | Ramsey et al. |
| 8,639,923 B2 | 1/2014 | Lo et al. |
| 8,656,482 B1 | 2/2014 | Tosa et al. |
| 8,683,585 B1 | 3/2014 | Chen et al. |
| 8,688,820 B1 | 4/2014 | Bhogi et al. |
| 8,726,383 B2 | 5/2014 | Blackwell |
| 8,776,050 B2 | 7/2014 | Plouffe et al. |
| 8,799,431 B2 | 8/2014 | Pabari |
| 8,813,225 B1 | 8/2014 | Fuller et al. |
| 8,863,284 B1* | 10/2014 | Polyakov ............. H04L 63/145 726/22 |
| 8,990,935 B1 | 3/2015 | Cutts |
| 9,047,582 B2 | 6/2015 | Hutchinson et al. |
| 9,049,105 B1 | 6/2015 | Feinstein et al. |
| 9,112,841 B1 | 8/2015 | Brandwine et al. |
| 9,215,153 B2 | 12/2015 | DeLuca et al. |
| 9,245,117 B2 | 1/2016 | Weaver et al. |
| 9,246,935 B2 | 1/2016 | Lietz et al. |
| 9,270,690 B2 | 2/2016 | Kraitsman et al. |
| 9,276,945 B2 | 3/2016 | Lietz et al. |
| 2002/0066034 A1 | 5/2002 | Schlossberg et al. |
| 2002/0099992 A1 | 7/2002 | Distler et al. |
| 2002/0116404 A1 | 8/2002 | Cha et al. |
| 2002/0138416 A1 | 9/2002 | Lovejoy et al. |
| 2002/0147803 A1 | 10/2002 | Dodd et al. |
| 2003/0046128 A1 | 3/2003 | Heinrich |
| 2003/0051154 A1 | 3/2003 | Barton et al. |
| 2003/0084327 A1 | 5/2003 | Lingafelt et al. |
| 2003/0088791 A1 | 5/2003 | Porras et al. |
| 2003/0110392 A1 | 6/2003 | Aucsmith et al. |
| 2003/0188191 A1 | 10/2003 | Aaron et al. |
| 2003/0195959 A1 | 10/2003 | Labadie et al. |
| 2003/0233438 A1 | 12/2003 | Hutchinson et al. |
| 2004/0006704 A1 | 1/2004 | Dahlstrom et al. |
| 2004/0010571 A1 | 1/2004 | Hutchinson et al. |
| 2004/0181775 A1 | 9/2004 | Anonsen et al. |
| 2004/0237093 A1 | 11/2004 | Sluiman et al. |
| 2004/0249973 A1 | 12/2004 | Alkhatib et al. |
| 2004/0249974 A1 | 12/2004 | Alkhatib et al. |
| 2005/0018618 A1 | 1/2005 | Mualem et al. |
| 2005/0066309 A1 | 3/2005 | Creamer et al. |
| 2005/0091304 A1 | 4/2005 | Trayler |
| 2005/0108571 A1 | 5/2005 | Lu et al. |
| 2005/0114836 A1 | 5/2005 | Fu |
| 2005/0155013 A1 | 7/2005 | Carrigan |
| 2005/0172162 A1 | 8/2005 | Takahashi et al. |
| 2005/0182969 A1 | 8/2005 | Ginter et al. |
| 2005/0183138 A1 | 8/2005 | Phillips et al. |
| 2005/0188222 A1 | 8/2005 | Motsinger et al. |
| 2005/0193231 A1 | 9/2005 | Scheuren |
| 2005/0193269 A1 | 9/2005 | Haswell et al. |
| 2005/0204151 A1 | 9/2005 | Fang et al. |
| 2005/0278790 A1 | 12/2005 | Birk et al. |
| 2006/0031407 A1 | 2/2006 | Dispensa et al. |
| 2006/0037077 A1 | 2/2006 | Gadde et al. |
| 2006/0090206 A1 | 4/2006 | Ladner et al. |
| 2006/0101519 A1 | 5/2006 | Lasswell et al. |
| 2006/0101520 A1 | 5/2006 | Schumaker et al. |
| 2006/0184838 A1 | 8/2006 | Singonahalli et al. |
| 2006/0203739 A1 | 9/2006 | Padmanabhan et al. |
| 2006/0248573 A1 | 11/2006 | Pannu et al. |
| 2006/0272018 A1* | 11/2006 | Fouant ................. H04L 63/1416 726/23 |
| 2006/0293940 A1 | 12/2006 | Tsyganskiy et al. |
| 2007/0027999 A1 | 2/2007 | Allen et al. |
| 2007/0043860 A1 | 2/2007 | Pabari |
| 2007/0079168 A1 | 4/2007 | Sivakumar et al. |
| 2007/0094711 A1 | 4/2007 | Corley et al. |
| 2007/0101400 A1 | 5/2007 | Freeman et al. |
| 2007/0169204 A1 | 7/2007 | Janakiraman et al. |
| 2007/0180509 A1 | 8/2007 | Swartz et al. |
| 2007/0185875 A1 | 8/2007 | Chang et al. |
| 2007/0204346 A1 | 8/2007 | Meier |
| 2007/0250424 A1 | 10/2007 | Kothari |
| 2008/0016570 A1 | 1/2008 | Capalik |
| 2008/0025288 A1 | 1/2008 | Benner et al. |
| 2008/0044018 A1 | 2/2008 | Scrimsher et al. |
| 2008/0141332 A1 | 6/2008 | Treinen |
| 2008/0148398 A1 | 6/2008 | Mezack et al. |
| 2008/0177691 A1 | 7/2008 | Alperovitch et al. |
| 2008/0256639 A1 | 10/2008 | Onoda et al. |
| 2008/0262990 A1 | 10/2008 | Kapoor et al. |
| 2008/0263670 A1 | 10/2008 | Stavrica |
| 2008/0295076 A1 | 11/2008 | McKain et al. |
| 2009/0007264 A1 | 1/2009 | Chatterjee et al. |
| 2009/0089682 A1 | 4/2009 | Baier et al. |
| 2009/0106838 A1 | 4/2009 | Clark et al. |
| 2009/0172788 A1 | 7/2009 | Vedula et al. |
| 2009/0177717 A1 | 7/2009 | Meehan et al. |
| 2009/0199273 A1 | 8/2009 | Yalamanchi |
| 2009/0228973 A1 | 9/2009 | Kumar et al. |
| 2009/0254970 A1 | 10/2009 | Agarwal et al. |
| 2009/0254990 A1 | 10/2009 | McGee |
| 2009/0288078 A1 | 11/2009 | Makonahalli et al. |
| 2009/0300045 A1 | 12/2009 | Chaudhry et al. |
| 2009/0300423 A1 | 12/2009 | Ferris |
| 2009/0319527 A1 | 12/2009 | King et al. |
| 2010/0020700 A1 | 1/2010 | Kailash et al. |
| 2010/0030544 A1 | 2/2010 | Gopalan et al. |

(56) References Cited

U.S. PATENT DOCUMENTS

| | | |
|---|---|---|
| 2010/0030878 A1 | 2/2010 | Grabowski et al. |
| 2010/0057660 A1 | 3/2010 | Kato |
| 2010/0070964 A1 | 3/2010 | Blumfield et al. |
| 2010/0076987 A1 | 3/2010 | Schreiner |
| 2010/0077203 A1 | 3/2010 | Ogawa et al. |
| 2010/0122317 A1 | 5/2010 | Yadav |
| 2010/0192220 A1 | 7/2010 | Heizmann et al. |
| 2010/0212010 A1 | 8/2010 | Stringer et al. |
| 2010/0217850 A1 | 8/2010 | Ferris |
| 2010/0235828 A1 | 9/2010 | Nishimura et al. |
| 2010/0251363 A1 | 9/2010 | Todorovic |
| 2010/0257580 A1 | 10/2010 | Zhao |
| 2010/0257599 A1 | 10/2010 | Gleichauf |
| 2010/0269121 A1 | 10/2010 | Montesissa et al. |
| 2010/0306354 A1 | 12/2010 | DeHaan et al. |
| 2010/0306772 A1 | 12/2010 | Arnold et al. |
| 2010/0318481 A1 | 12/2010 | Feynman |
| 2011/0029957 A1 | 2/2011 | Shufer et al. |
| 2011/0034182 A1 | 2/2011 | Issa et al. |
| 2011/0047621 A1 | 2/2011 | Brando et al. |
| 2011/0055921 A1 | 3/2011 | Narayanaswamy et al. |
| 2011/0067097 A1 | 3/2011 | Park et al. |
| 2011/0101109 A1 | 5/2011 | Bona et al. |
| 2011/0107398 A1 | 5/2011 | Earl et al. |
| 2011/0138382 A1 | 6/2011 | Hauser et al. |
| 2011/0138469 A1 | 6/2011 | Ye et al. |
| 2011/0145657 A1 | 6/2011 | Bishop et al. |
| 2011/0154324 A1 | 6/2011 | Pagan et al. |
| 2011/0167494 A1 | 7/2011 | Bowen et al. |
| 2011/0197065 A1 | 8/2011 | Stauth et al. |
| 2011/0208677 A1 | 8/2011 | Zhou et al. |
| 2011/0208797 A1 | 8/2011 | Kim |
| 2011/0238855 A1 | 9/2011 | Korsunsky et al. |
| 2011/0258692 A1 | 10/2011 | Morrison et al. |
| 2012/0005750 A1 | 1/2012 | Satish |
| 2012/0011510 A1 | 1/2012 | Yamakabe et al. |
| 2012/0039336 A1 | 2/2012 | Richmond et al. |
| 2012/0072985 A1 | 3/2012 | Davne et al. |
| 2012/0110672 A1 | 5/2012 | Judge et al. |
| 2012/0117654 A1 | 5/2012 | Yalakanti |
| 2012/0137367 A1 | 5/2012 | Dupont et al. |
| 2012/0151488 A1 | 6/2012 | Arcese et al. |
| 2012/0151553 A1 | 6/2012 | Burgess et al. |
| 2012/0185390 A1 | 7/2012 | Palnitkar et al. |
| 2012/0185913 A1 | 7/2012 | Martinez et al. |
| 2012/0209947 A1 | 8/2012 | Glaser et al. |
| 2012/0210437 A1 | 8/2012 | Karande et al. |
| 2012/0233668 A1 | 9/2012 | Leafe et al. |
| 2012/0240193 A1 | 9/2012 | Littlefield et al. |
| 2012/0266167 A1 | 10/2012 | Spiers et al. |
| 2012/0291094 A9 | 11/2012 | Forrester et al. |
| 2012/0303776 A1 | 11/2012 | Ferris |
| 2012/0304300 A1 | 11/2012 | LaBumbard |
| 2012/0311016 A1 | 12/2012 | DeAnna et al. |
| 2012/0311157 A1 | 12/2012 | Erickson et al. |
| 2012/0311387 A1 | 12/2012 | Santhosh et al. |
| 2012/0324446 A1 | 12/2012 | Fries et al. |
| 2012/0324572 A1 | 12/2012 | Gordon et al. |
| 2012/0324576 A1 | 12/2012 | Clark et al. |
| 2013/0019242 A1 | 1/2013 | Chen et al. |
| 2013/0046667 A1 | 2/2013 | Hill et al. |
| 2013/0054792 A1 | 2/2013 | Sharaf |
| 2013/0055398 A1 | 2/2013 | Li et al. |
| 2013/0067067 A1 | 3/2013 | Miri et al. |
| 2013/0091376 A1 | 4/2013 | Raspudic et al. |
| 2013/0097316 A1 | 4/2013 | Bender et al. |
| 2013/0097701 A1 | 4/2013 | Moyle et al. |
| 2013/0104237 A1 | 4/2013 | Riley et al. |
| 2013/0117567 A1 | 5/2013 | Chang et al. |
| 2013/0117809 A1 | 5/2013 | McDougal et al. |
| 2013/0117852 A1 | 5/2013 | Stute |
| 2013/0124712 A1 | 5/2013 | Parker |
| 2013/0125121 A1 | 5/2013 | White |
| 2013/0132854 A1 | 5/2013 | Raleigh et al. |
| 2013/0133072 A1 | 5/2013 | Kraitsman et al. |
| 2013/0160072 A1 | 6/2013 | Reus et al. |
| 2013/0174259 A1 | 7/2013 | Pearcy et al. |
| 2013/0185795 A1 | 7/2013 | Winn et al. |
| 2013/0227695 A1 | 8/2013 | Shankar |
| 2013/0238786 A1 | 9/2013 | Khesin |
| 2013/0247133 A1 | 9/2013 | Price et al. |
| 2013/0247135 A1 | 9/2013 | Kundu et al. |
| 2013/0247207 A1 | 9/2013 | Hugard et al. |
| 2013/0276108 A1 | 10/2013 | Blackwell |
| 2013/0276152 A1 | 10/2013 | Hirsch et al. |
| 2013/0291068 A1 | 10/2013 | Huang et al. |
| 2013/0291087 A1 | 10/2013 | Kailash et al. |
| 2013/0304693 A1 | 11/2013 | Jaeger et al. |
| 2013/0305357 A1 | 11/2013 | Ayyagari et al. |
| 2013/0305369 A1 | 11/2013 | Karta et al. |
| 2013/0305371 A1 | 11/2013 | Figlin et al. |
| 2013/0318599 A1 | 11/2013 | Fadida et al. |
| 2013/0326580 A1 | 12/2013 | Barclay et al. |
| 2013/0339514 A1 | 12/2013 | Crank et al. |
| 2013/0343207 A1 | 12/2013 | Cook et al. |
| 2013/0346596 A1 | 12/2013 | Balakrishnan et al. |
| 2013/0347131 A1 | 12/2013 | Mooring et al. |
| 2014/0013452 A1 | 1/2014 | Aissi et al. |
| 2014/0026122 A1 | 1/2014 | Markande et al. |
| 2014/0026179 A1 | 1/2014 | Devarajan et al. |
| 2014/0040299 A1 | 2/2014 | Datla et al. |
| 2014/0047546 A1 | 2/2014 | Sidagni |
| 2014/0068784 A1 | 3/2014 | Merkow et al. |
| 2014/0074799 A1 | 3/2014 | Karampuri et al. |
| 2014/0082621 A1 | 3/2014 | Fitzgerald et al. |
| 2014/0089204 A1 | 3/2014 | Spies et al. |
| 2014/0096134 A1 | 4/2014 | Barak et al. |
| 2014/0109192 A1 | 4/2014 | Pidault et al. |
| 2014/0165130 A1 | 6/2014 | Zaitsev |
| 2014/0173738 A1 | 6/2014 | Condry et al. |
| 2014/0189090 A1 | 7/2014 | Mikkilineni |
| 2014/0189680 A1 | 7/2014 | Kripalani |
| 2014/0196104 A1 | 7/2014 | Chari et al. |
| 2014/0201836 A1* | 7/2014 | Amsler .................. H04L 63/20 726/23 |
| 2014/0214460 A1 | 7/2014 | Rahnama |
| 2014/0258446 A1 | 9/2014 | Bursell |
| 2014/0258715 A1 | 9/2014 | Rodniansky |
| 2014/0259169 A1 | 9/2014 | Harrison |
| 2014/0282840 A1 | 9/2014 | Guinan |
| 2014/0282889 A1 | 9/2014 | Ishaya et al. |
| 2014/0289854 A1 | 9/2014 | Mahvi |
| 2014/0317737 A1 | 10/2014 | Shin et al. |
| 2014/0344933 A1 | 11/2014 | Huh et al. |
| 2015/0032587 A1 | 1/2015 | Broom et al. |
| 2015/0033340 A1 | 1/2015 | Giokas |
| 2015/0052108 A1 | 2/2015 | Volk et al. |
| 2015/0052402 A1 | 2/2015 | Gurumurthy et al. |
| 2015/0052520 A1 | 2/2015 | Crowell et al. |
| 2015/0095691 A1 | 4/2015 | Edwards |
| 2015/0106939 A1 | 4/2015 | Lietz et al. |
| 2015/0128130 A1 | 5/2015 | Weaver et al. |
| 2015/0128246 A1 | 5/2015 | Feghali et al. |
| 2015/0128274 A1 | 5/2015 | Giokas |
| 2015/0128295 A1 | 5/2015 | Gryb et al. |
| 2015/0135305 A1 | 5/2015 | Cabrera et al. |
| 2015/0150123 A1 | 5/2015 | Be'ery et al. |
| 2015/0186641 A1 | 7/2015 | Cabrera et al. |
| 2015/0215327 A1 | 7/2015 | Cabrera et al. |
| 2015/0222647 A1 | 8/2015 | Lietz et al. |
| 2015/0222653 A1 | 8/2015 | Cabrera et al. |
| 2015/0229661 A1 | 8/2015 | Balabine et al. |
| 2015/0242631 A1 | 8/2015 | Cabrera et al. |
| 2015/0242634 A1 | 8/2015 | Lietz et al. |
| 2015/0269064 A1 | 9/2015 | Bishop et al. |
| 2015/0271195 A1 | 9/2015 | Lietz et al. |
| 2015/0278523 A1 | 10/2015 | Brinkley et al. |
| 2015/0304343 A1 | 10/2015 | Cabrera et al. |
| 2015/0312274 A1 | 10/2015 | Bishop et al. |
| 2015/0319177 A1 | 11/2015 | Lietz et al. |
| 2015/0319186 A1 | 11/2015 | Lietz et al. |
| 2015/0347759 A1 | 12/2015 | Cabrera et al. |
| 2015/0347773 A1 | 12/2015 | Bonney et al. |
| 2015/0371044 A1 | 12/2015 | Horne et al. |

(56) References Cited

U.S. PATENT DOCUMENTS

| | | |
|---|---|---|
| 2015/0381641 A1 | 12/2015 | Cabrera et al. |
| 2015/0381651 A1 | 12/2015 | Lietz et al. |
| 2016/0034359 A1 | 2/2016 | Cabrera et al. |
| 2016/0036795 A1 | 2/2016 | Lietz et al. |
| 2016/0036835 A1 | 2/2016 | Lietz et al. |
| 2016/0098340 A1 | 4/2016 | Weaver et al. |

FOREIGN PATENT DOCUMENTS

| | | |
|---|---|---|
| WO | WO 2012/135192 | 10/2012 |
| WO | WO 2013/067404 | 5/2013 |
| WO | WO 2013/123548 | 8/2013 |
| WO | WO 2015/102776 | 7/2015 |

OTHER PUBLICATIONS

Lietz et al., "Method and System for Creating and Dynamically Deploying Resource Specific Discovery Agents for Determining the State of a Cloud Computing Environment," U.S. Appl. No. 14/079,425, filed Nov. 13, 2013.

Lietz et al., "Method and System for Creating Enriched Log Data," U.S. Appl. No. 14/139,449, filed Dec. 23, 2013.

"VMware Backdoor I/O Port," [online], [retrieved Sep. 2, 2015]. Retrieved from the internet. <URL: http://sites.google.com/site/chitchatvmback/backdoor>.

"What is the Virtual Machine Backdoor," [online], [retrieved Sep. 2, 2015]. Retrieved from the internet. <URL: http://communities.vmware.com/thread/228415?start=0&start=0>.

Tupakula, et al.; "Intrusion Detection Techniques for Infrastructure as a Service Cloud;" 2011 IEEE Ninth International Conference on Dependable, Autonomic and Secure Computing; Dec. 12-14, 2011; IEEE.

Tupakula, et al.; "Security Techniques for Zero Day Attacks;" Proceedings of the 7th International Wireless Communications and Mobile Computing Conference; Jul. 4-8, 2011; IEEE.

\* cited by examiner

THREAT MODEL QUESTIONAIRE 200

Q1-APPLICATION TYPE: ○ SURVEY  ○ MARKET PLACE  ○ BLOG  ○ FINANCIAL SERVICE
○ EDUCATION   ○ OTHER, PLEASE SPECIFY [     ]

Q2-CONFIGURATION OF HOSTING ASSET(S):   ASSET METADATA UPLOAD [□];
MANUALLY ENTER HW/SW CONFIGURATION [     ]; or
SELECT PRE-DETERMINED CONFIGURATION OFFERED BY ASSET SERVICE PROVIDER -

| STORAGE OPTIMIZED ▼ | AND | MEDIUM ▼ |
| --- | --- | --- |
| GENERAL PURPOSE | | SMALL |
| COMPUTE OPTIMIZED | | LARGE |
| GPU INSTANCE | | X-LARGE |
| ⋮ | | ⋮ |

Q3-API QUERIES:  API QUANTITY [ 15 ] ; API TYPES [ WEB SERVICE ▼ ]
FOR EACH API, IS EACH API PARAMETER CHECKED FOR VALIDITY? [ YES ▼ ]

Q4-PLEASE IDENTIFY THE COLLECTIONS-ORIENTED APIs: [     ]
  FOR COLLECTIONS-ORIENTED API, DO YOU PROTECT AGAINST:
    -TICKLE ATTACK.................... [ YES ▼ ]
    -SPOOFING IDENTITY............... [ YES ▼ ]
    -TAMPERING WITH DATA........... [ YES ▼ ]
    -REPUDIATION....................... [ YES ▼ ]
    -INFORMATION DISCLOSURE...... [ YES ▼ ]
    -DENIAL OF SERVICE................ [ YES ▼ ]
    -ELEVATION OF PRIVILEGE........ [ YES ▼ ]
    ⋮

QX-ADDITIONAL QUESTIONS BASED ON RESPONSES TO PREVIOUS QUESTIONS...
  ⋮

FIG. 2

METHOD AND APPARATUS FOR AUTOMATING THREAT MODEL GENERATION AND PATTERN IDENTIFICATION

RELATED APPLICATIONS

This application is a continuation of Cabrera, et al., U.S. patent application Ser. No. 14/288,260 (INTU148037), filed on May 27, 2014, entitled "METHOD AND APPARATUS FOR AUTOMATING THE BUILDING OF THREAT MODELS FOR THE PUBLIC CLOUD," which is herein incorporated by reference in its entirety as if it were fully set forth herein. This application is also a continuation of Lietz, et al., U.S. patent application Ser. No. 14/448,405 (INTU148422), filed on Jul. 31, 2014, entitled "METHOD AND SYSTEM FOR CORRELATING SELF-REPORTING VIRTUAL ASSET DATA WITH EXTERNAL EVENTS TO GENERATE AN EXTERNAL EVENT IDENTIFICATION DATABASE," which is herein incorporated by reference in its entirety as if it were fully set forth herein.

BACKGROUND

Software application developers use a variety of techniques to protect their applications from unauthorized use and malicious attacks. One such technique includes modeling or matching up the potential security threats with corresponding solutions, for an application that is under development. Traditionally, an application developer models security threats by manually listing the potential security threats and manually listing solutions to address each security threat for that particular application. In some cases, an application developer will model security threats by himself/herself, while in other cases the application developer will assemble a team of software architecture experts or other subject matter experts to discuss potential security issues for application, and to identify solutions for addressing the potential security threats. However, manually modeling security threats may confine the protection to the extent of an application developer's working knowledge of security threats. Additionally, modeling security threats can be a time-consuming procedure that adds procedural burdens or distractions that are above and beyond the substantive need to develop the application itself.

Further, security threat mechanisms in computing systems may use a variety of techniques for detecting potential security threats. Some of those techniques may include comparing the communications traffic of the computing system to one or more digital signatures that are indicative of known security threats. Further, operational characteristics of the computing systems can also be monitored to assist in detecting potential security threats. However, when a computing system detects operational characteristics that exceed normal operational characteristics and that do not match patterns that are indicative of a known security threat, the computing system may have to cease operations, e.g., providing services to users, until one or more human resources evaluate the anomalous operational characteristics detected by the computing system.

What is needed is a method and system that enables automating threat model generation and pattern identification for application developers. What is also needed is a method and system for correlating data or patterns from computing systems or virtual assets with external events to provide additional explanations for deviations in normal operating characteristics.

SUMMARY

In accordance with one embodiment, a method and system for automating threat model generation and pattern identification for an application includes identifying components of an application, receiving security information that identifies whether security measures were implemented within the application to secure the application against security threats, determining whether the security measures sufficiently address security risks associated with the security threats, and providing a threat model that includes a report that identifies components of the application that have or have not been sufficiently secured from the security threats. In one embodiment, determining whether the security measures sufficiently address the security risks can include transmitting first queries, receiving responses to the first queries, and transmitting subsequent queries based at least in part on the responses to the first queries.

In accordance with one embodiment, a method and system for automating threat model generation and pattern identification includes receiving, with a first computing environment, an identification of one of the external events, from one or more electronic sources. The method and system include receiving first patterns from one or more first virtual assets, according to one embodiment. Each of the one or more first virtual assets may provide one or more computing services to one or more users. Each of the one or more first virtual assets may include an allocation of one or more hardware and software resources from a second computing environment. The first patterns may represent first operational characteristics of the one or more first virtual assets. The method and system include populating a database with the first patterns and the identification of the one of the external events to map the one of the external events to the first patterns, according to one embodiment. The method and system include receiving second patterns from one or more second virtual assets, where the second patterns represent second operational characteristics of the one or more second virtual assets, according to one embodiment. The method and system include comparing the second patterns to the first patterns, and distributing the identification of the one of the external events to the one or more second virtual assets, if the second patterns are similar to the first patterns, according to one embodiment.

In accordance with one embodiment, a method and system for automating threat model generation and pattern identification includes receiving, with the computing environment, a first security threat against a first virtual asset, where the first security threat is detected by the first virtual asset and the first virtual asset is hosted by the computing environment, according to one embodiment. The first virtual asset may represent an allocation of hardware and software resources within the computing environment for management by a tenant, and the first virtual asset may provide one or more services to one or more users. The method and system include adding the first security threat to the collection of security threats, where the collection of security threats may be hosted by the computing environment, according to one embodiment. The method and system include receiving a request from a second virtual asset for a status of the collection of security threats, in response to detection of changes in network performance within the computing environment by the second virtual asset, and transmitting the status of the collection of security threats to the second virtual asset, according to one embodiment.

In one embodiment, determining whether the measures of the security information sufficiently address security risks associated with the list of security threats, includes forwarding responses to queries to a subject matter expert or security expert to enable the subject matter expert or security expert to determine a sufficiency of the measures of the security information.

In one embodiment, the method and system also includes providing a graphical user interface to receive input associated with the application, and identifying the components of the application by receiving information regarding the components of the application through the graphical user interface.

In one embodiment, determining whether the measures of the security information sufficiently address security risks associated with the list of security threats includes determining whether the security information conforms with requirements of a security policy for the asset that is managed by the service provider.

BRIEF DESCRIPTION OF THE DRAWINGS

FIG. 2 is a block diagram of a user interface for automating threat model generation and pattern identification, in accordance with one embodiment;

Figure 1:
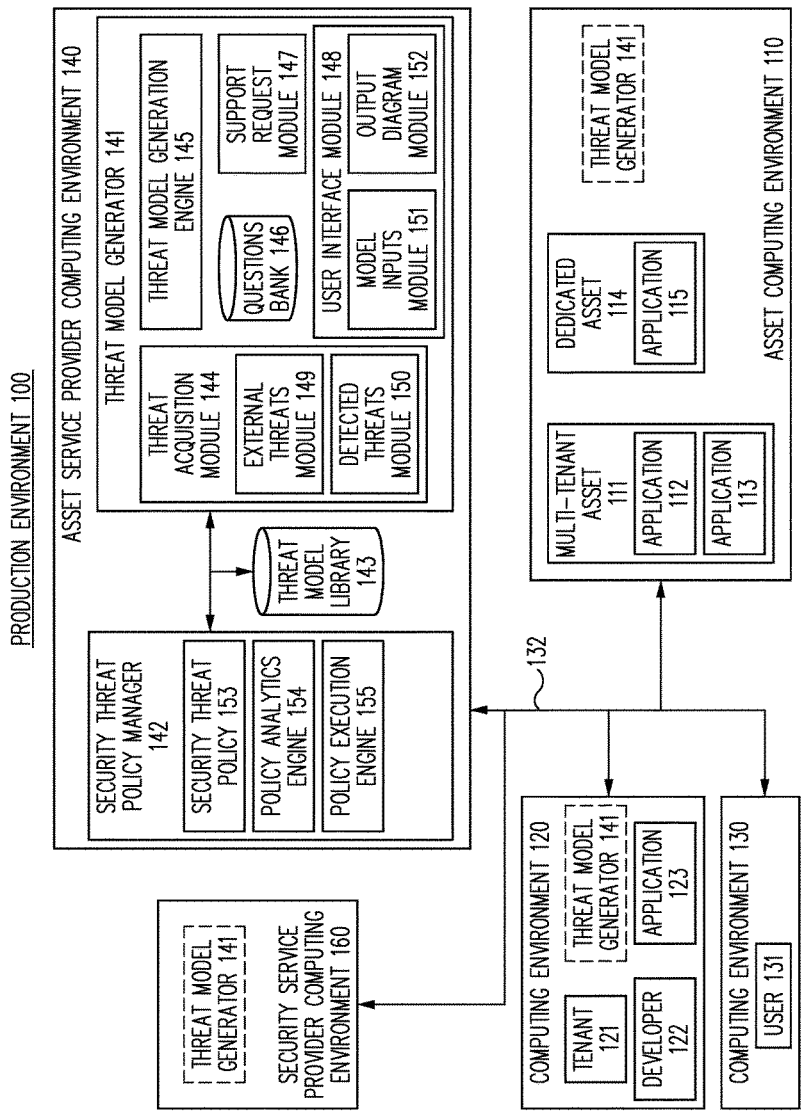
FIG. 1 is a block diagram of a hardware architecture for automating threat model generation and pattern identification, in accordance with one embodiment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, USER INTERFACE, and PROCESS sections herein include systems and processes suitable for incorporating various embodiments of methods and systems for automating threat model generation and pattern identification for an application, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems;

firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that application data must be transferred between a first computing environment that is an untrusted computing environment and a second computing environment that is a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein, virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "tenant" includes, but is not limited to, any user that enters a relationship, agreement, and/or contract, with an asset service provider or other service provider to receive an allocation of one or more assets or asset resources within an asset computing environment. In some embodiments, the terms "tenant" and "tenant computing environment" are interchangeably used even though, in some cases, a tenant represents a party, parties, or entities while the tenant computing environment represents one or more computing resources that are used by or that are at least partially under the control of the tenant.

Hardware Architecture

FIG. 1 illustrates a block diagram of a production environment 100 for implementing automated threat model generation for an application, according to one embodiment. A threat model can be, but is not limited to, an analysis, description, identification, and/or record of potential security threats to an application. As used herein, a security threat can be, but is not limited to, a security weakness or attack point in a software application that is susceptible to any one of a number of malicious manipulations. A threat model can also include an analysis, description, identification, and/or record of available, recommended, and/or implemented measures for protecting the application from the one or more identified security threats. According to various embodiments, measures for protecting an application can include specific algorithms, types of procedures, and/or particular services that are incorporated into or associated with the application under development.

In one embodiment, production environment 100 is configured to correlate virtual asset patterns or data with external events by generating and maintaining an external events identification library, such as a portion of threat model library 143, according to one embodiment. Production environment 100 initializes an external events library, such as a portion of threat model library 143, with patterns, e.g., operations patterns or data patterns, from virtual assets that are generated during one or more external events, such as natural disasters, sporting events, wars, acts of terrorism, or the like, according to one embodiment. Production environment 100 maintains and develops the events library by continuously or periodically adding additional patterns from virtual assets that are generated during the external events, according to one embodiment. The production environment 100 can acquire patterns from virtual assets by pulling the patterns from the virtual assets when external events are detected, or by configuring the virtual assets to periodically push patterns to a virtual asset manager, according to one embodiment. The production environment 100 supports self-monitoring and self-healing virtual assets by providing a library of external events that may match one or more virtual asset patterns, e.g., anomalies, aberrations, and/or deviations in operational data for the virtual assets, according to one embodiment.

Self-monitoring and self-healing virtual assets can detect patterns, such as data patterns or operational patterns, that are inconsistent with historical operations or historic operating patterns for a particular virtual asset. The virtual asset can be configured to compare the deviant patterns against one or more security threat libraries/databases to determine whether the deviant patterns are consistent with a known or characterized security threat. However, if the virtual asset detects deviant patterns that are both inconsistent with historical operating patterns and that do not match security threat database patterns, the virtual asset can fall short of operating autonomously of a system administrator, security personnel, or other human resources. Unexplained operating patterns can be indicative of service failures, hacker activity, or other grave issues, so unexplained operating patterns may, by default, result in automated requests for support by human resources. Providing an external events library enables the self-monitoring and self-healing virtual assets to operate smarter, e.g., more autonomous of human resources, and properly react to deviations in historic operating patterns, according to one embodiment.

The production environment 100 enables self-monitoring and self-healing virtual assets to troubleshoot and/or dismiss detected patterns that are inconsistent with historic operating patterns for the virtual assets, by providing an event library of patterns that correlate with external events, according to one embodiment.

Threat model library 143 provides virtual assets with a correlation between virtual asset patterns and external events, according to one embodiment. Threat model library 143 can support virtual assets in recognizing seasonal, periodic, random and other external events by storing patterns that were generated by virtual assets during one or more external events, according to one embodiment. Threat model library 143 is updated with external events and their corresponding virtual asset patterns continuously, periodically, or as external events occur, according to various embodiments. Threat model library 143 is implemented as one or more tables, a database, or one or more other data structures, to organize and/or map external events to their corresponding one or more sets of virtual asset patterns, according to various embodiments.

Examples of virtual asset patterns that are collected, analyzed, and mapped to external events include any event, trigger, and/or deviation from a desired, nominal, or predetermined operation of a virtual asset, according to one embodiment. In various embodiments, the patterns can include combinations of one or more of: available network bandwidth, denial of request to instantiate or terminate other virtual assets, processor usage percentage, memory usage percentage, number of queries, types of queries, quantity of traffic with respect to a mean or average, number of users, failure to communicate with other asset containers, receipt of a network message from a location known to be associated with malicious entities, frequency of outgoing network messages, communications with destinations that are not associated with a customer location of record, frequency of login attempts, frequency of failed login attempts, a size of parameters sent to the virtual asset, a size of outgoing network messages, a total quantity of data in any one communication, failure to perform important or critical operations, and other virtual asset operations discussed herein, and/or as known in the art at the time of filing, and/or as developed/made available after the time of filing. As discussed below, each of the virtual assets is configured to self-monitor virtual asset operations and communications, self-report patterns detected within the virtual asset operations, and/or to save the detected patterns to one or more libraries or databases, according to various embodiments.

Threat model library 143 may organize all external events into two categories: external events, and internal events, according to one embodiment. External events represent events that occur external to, away from, or outside of a computing environment hosting one or more virtual assets, according to one embodiment. Internal events represent events that are external to a virtual asset, but that occur internal to, within, or at a computing environment that hosts virtual assets, according to one embodiment. Examples of computing environments that host virtual assets include, but are not limited to, data centers, computer rooms, server cabinets, or other facilities used to house computing systems for hosting virtual assets.

External events include, but are not limited to, war (e.g., Syrian Civil War), terrorism (e.g., intentionally downed passenger airplanes), and infrequently occurring natural disasters (e.g., volcanoes and earthquakes), sporting events (e.g., the World Cup), political events (e.g., presidential elections), and natural disasters (e.g., a hurricane, a tornado, an earthquake, a tsunami, a typhoon, a volcano, a flood).

Events may include malicious software infections and/or intrusions, natural disasters, and/or miscellaneous events, according to various embodiments. Malicious software ("malware") includes, but is not limited to, viruses, worms, Trojans horses, denial of service ("DOS") attacks, spoofing, pharming, and/or any other computer code deployed with malicious intent. A virtual asset may detect an abnormal pattern when the virtual asset attempts to communicate with other, regionally separated, virtual assets. For example, services provided in particular regions, e.g., Asia, South America, etc., may have language packs built into the virtual asset services, and the language packs may have one or more vulnerabilities to malware that have been exploited, such as by hackers. The vulnerabilities may manifest themselves to virtual assets in other regions as abnormally slow response times, rejections of requests for information, or failures to perform pre-established security updates or check-ins, according to various embodiments. Threat model library 143 includes correlations between virtual asset patterns and region-based or function-based external events that affect computing environments, according to one embodiment.

Natural disasters that can affect the computing resources physically located in a computing environment, e.g., a data center, include, but are not limited to, earthquakes, tornadoes, torrential rainfall, floods, and hurricanes. These external events can interfere with the operations of one or more virtual assets by disrupting or destroying power or communication pathways to a computing environment or to network resources used by the computing environment to communicate with other geographic locations. Even if a computing environment includes resources for providing emergency backup power, a tornado, earthquake, or hurricane can physically remove communication pathways between a virtual asset located in a first computing environment and a virtual asset located in a second computing environment. The destruction or isolation of an entire computing environment, due to a natural disaster, can be mapped to the virtual asset patterns in threat model library 143, according to one embodiment. A mapping or correlation of virtual asset patterns to the destruction or isolation of an entire computing environment may be represented by denial of service from the isolated computing environment, failure to establish connections to the isolated computing environment, and/or an abrupt loss of incoming data or information from the isolated computing environment, according to various embodiments. By submitting a detected pattern to threat model library 143, a virtual asset may receive confirmation that the reason for failed communications is the isolation of a remotely located computing environment, rather than the invasion of a security threat, according to one embodiment.

Miscellaneous events that are internal to a computing environment can include times when neighboring computing systems, virtual assets, or computing environments consume disproportionately large quantities of resources, e.g., network bandwidth. The disproportionately large consumption of resources can be due to extraordinary success of an application hosted by the neighboring computing system, or can be indicative of a DOS attack on the neighboring computing system, according to various embodiments. Threat model library 143 can be updated to include security threat breaches occurring in computing systems that share a computing environment, e.g., a data center, with a virtual asset, according to one embodiment. Thus, when the virtual asset detects a pattern such as a decrease in data center resources, the virtual asset can confirm that it has not been compromised to a security threat, but instead can confirm that the neighboring computing system has been compromised, according to one embodiment.

Threat model library 143 enables virtual assets of different asset containers to proactively redistribute services to unaffected resources, according to one embodiment. For example, if a virtual asset in a first asset container detects a pattern that threat model library 143 correlates to a political event, sporting event, or other external event that will reduce a quality of services the virtual asset can provide, the virtual asset can be configured to instantiate a new virtual asset or be configured to transfer service hosting to a virtual asset in a different asset container which may not be affected by the external event, according to one embodiment. As another example, if a virtual asset in a first asset container uses virtual assets in a second asset container to provide duplicative or backup services, and the virtual asset in the first asset container detects a pattern that threat model library 143 correlates to a destruction or isolation of the second asset container, the virtual asset in the first asset container can be configured to instantiate one or more new virtual assets in another asset container, e.g., a third or fourth asset container, so that the virtual asset ensures duplicative services are provided, according to one embodiment.

An asset service provider may require that a tenant of the service provider's assets comply with one or more security-related criteria before or while hosting an application on the surface provider's assets. As used herein, a tenant of an asset may be, but is not limited to, a customer or authorized person or organization to which one or more instances or computing resources of an asset are allocated for use, e.g., for running or hosting a software application. The asset service provider may want to standardize and customize processes for confirming that a tenant or tenant's developer has adequately or sufficiently identified and addressed security threats that the tenant's application may be particularly susceptible to. The asset service provider may therefore request responses from the tenant for a variety of questions related to the tenant's application. According to one embodiment, the asset service provider may execute a threat model generator to ensure that the tenant has considered and/or addressed security threats that are associated with or pertinent to the tenant's application.

According to one embodiment, to improve the security of its application, a tenant may solicit use of a threat model generator during the development of an application that the tenant wishes to host, execute, or run on one or more assets of the asset service provider. The threat model generator may be configured to provide a customized list of questions to the tenant, receive responses to the questions from the tenant, and provide one or more reports or diagrams to the tenant that identify aspects of an application that have been sufficiently secured from security threats. The one or more reports or diagrams also identify aspects of an application that have not been sufficiently secured from security threats, from the perspective of the asset service provider, according to one embodiment.

The production environment 100 provides automated threat model generation for an application using one or more computing environments described hereinafter, according to various embodiments. Although each of the computing environments of production environment 100 is illustrated as a distinct component, one or more of the computing environments may be physically and/or functionally combined. Alternatively, as will be appreciated by one of ordinary skill in the art, in some embodiments the logical functions or modules that are grouped together by the illustrated computing environments may be physically and/or functionally separated into additional computing environments that are not presently shown. According to one embodiment, the production environment 100 includes an asset computing environment 110, a computing environment 120, a computing environment 130, an asset service provider computing environment 140, and a security service provider computing environment 160.

The asset computing environment 110 provides hardware, software, and/or virtual resources and assets to customers of the service provider, according to one embodiment. The assets or resources of the asset computing environment 110 may be assigned or allocated to the tenant associated with the tenant computing environment 120, in response to one or more of tenants entering an agreement, contract, or other relationship with the service provider, according to one embodiment. As described above, assets can include virtual and non-virtual assets and can be, but are not limited to, virtual machines, virtual servers, databases, services associated with cloud computing, communications systems, mobile devices, sensors, various computing systems and other physical or logical portions of a data center, according to various embodiments. In one embodiment, the asset service provider enables tenants to manage, create, or instantiate an instance of hardware, firmware, and/or software resources for hosting a tenant's application(s). The asset computing environment 110 includes a multi-tenant asset 111 that hosts applications 112 and 113, and a dedicated asset 114 that hosts an application 115, according to various embodiments. Although two assets 111 and 114 are illustrated in the production environment 100, in various embodiments, a greater or fewer number of multi-tenant or dedicated assets may be included in the asset computing environment 110, according to other embodiments.

According to various embodiments, each of the applications and assets of the asset computing environment 110 can perform a particular function and/or have a particular relationship with the computing environment 120. In one embodiment, the multi-tenant asset 111 and the applications 112, 113 provide computing services for a tenant 121 of the computing environment 120 and for one or more other tenants that may be associated with other computing environments (not shown). For example, the multi-tenant asset 111 and the application 112, 113 can provide database hosting, information management/security, file transfer, or other computing services for both the tenant 121 and another tenant. In one embodiment, the multi-tenant asset 111 allows tenants to execute, host, and/or run applications, e.g., the application 112, 113, from the resources of the multi-tenant asset 111. For example, the multi-tenant asset 111 may host the application 112 for one tenant, while concurrently hosting the application 113 for another tenant, from the same hardware and/or software resources within the asset computing environment 110. The applications 112 and 113 may be independent of one another while sharing storage space, network resources, computer processors, random access memory, server rack storage space, or other resources of the multi-tenant asset 111. In one embodiment, the multi-tenant asset 111 provides resources that enable multiple tenants to jointly provide users with services through the application 112. In one particular example, the application 112 may be configured to receive, store, and organize financial data for a user 131 of a computing environment 130, according to one embodiment.

The dedicated asset 114 provides computing services for a single tenant, such as the tenant 121 or a developer 122 of the computing environment 120. In one embodiment, the dedicated asset 114 includes hardware or software resources that are allocated to the single tenant and not shared with other tenants or customers associated with the asset computing environment 110. For example, the dedicated asset 114 can include hardware or software resources such as a non-volatile memory, a server, a server cabinet, an operating system, a virtual device, or other asset or virtual asset, according to one embodiment. The dedicated asset 114 can be configured to host or execute the application 115 for the tenant 121 or the developer 122. The dedicated asset 114 can host the application 115 to make the application 115 available to a number of users, such as the user 131, without providing the users with direct access to the computing environment 120 or to other computing resources of the tenant 121 or the developer 122.

The computing environment 120 represents a computing environment of a tenant or customer of the service provider, e.g., the tenant 121, according to one embodiment. The computing environment 120 may be owned, operated, or be under the direction or control of the tenant 121, and the tenant 121 may represent any one of a number of types of customers. According to various embodiments, the tenant 121 includes, but is not limited to, one or more individuals, families, small/medium/large businesses, educational institutions, organizations, entities, or parties. The computing environment 120 includes the tenant 121, the developer 122, and the application 123.

The developer 122 includes, but is not limited to, one or more application developers or one or more application developer computing devices that may create, manage, manipulate, edit, upload, maintain, or otherwise take part in developing, updating, and/or maintaining the applications 112, 113, 115, and/or 123. In one embodiment, the application 123 represents an application that is under development, e.g., in the planning phase, coding phase, or testing phase, prior to inserting into an asset or instance of an asset of the asset computing device 110. In one embodiment, the applications 112, 113, and/or 115 represent applications that are have already been transferred from a development computing environment and are being executed or are capable of being executed by an asset or an instance of an asset.

The computing environment 130 includes one or more users that may have contractual or other relationships with the tenant 121 to use or receive services from one or more applications 112, 113, and/or 115. The computing environment 130 includes the user 131, according to one embodiment. As will be appreciated by one of ordinary skill in the art, the computing environment 130 may include more users than illustrated in the production environment 100. In one embodiment, the user 131 receives information or services through the multi-tenant asset 111 or the dedicated asset 114 as a client or customer of the tenant 121 or of the developer 122.

A communication channel 132 provides communicative coupling between the asset computing environment 110, the computing environment 120, the computing environment 130, the asset service provider computing environment 140, and the security service provider computing environment 160, according to one embodiment. The communication channel 132 can be a network within the production environment 100 and can include, but is not be limited to, a local area network, a wide area network, a wireless network, the Internet, an intranet, or other network or communications protocols or environments, according to various embodiments.

The asset service provider computing environment 140 assigns or allocates control over one or more assets or portions of assets in the asset computing environment 110 to the computing environment 120, e.g., the tenant computing environment, according to one embodiment. The asset service provider computing environment 140 may allocate control over assets, within the asset computing environment 110, to the computing environment 120 by creating one or more user accounts having, for example, permission levels associated with a 'tenant' or 'customer.' In one embodiment, the tenant or customer permission levels may be different than the permission levels of other non-tenant users and may enable the tenant 121, the developer 122, and/or the computing environment 120 to add, remove, modify, protect, or otherwise manipulate information within the asset computing environment 110. In other words, the service provider may enable a first tenant to add, remove, view, or otherwise manipulate the first tenant's data stored in the asset computing environment 110 and may enable a second tenant to add, remove, view, or otherwise manipulate the second tenant's data stored in the asset computing environment 110. In some implementations, the tenant 121 may use authentication information received from the asset service provider to "log in" to assets or instances of the assets allocated to the tenant 121 from any computing system or environment, and is not limited to accessing the asset computing environment 110 solely from the computing environment 120. In one embodiment, the features or functionality of the asset service provider computing environment 140 are incorporated into the asset computing environment 110.

In addition to allocating and managing assets of the asset computing environment 110, the asset service provider computing environment 140 also maintains the security of the asset computing environment 110, according to one embodiment. The asset service provider computing environment 140 maintains the security of the asset computing environment 110 by ensuring that applications hosted by assets or instances within the asset computing environment 110 satisfy one or more conditions that are determined or set forth by the service provider, e.g., via the asset service provider computing environment 140, according to one embodiment. More particularly, the asset service provider computing environment 140 maintains the security of the asset computing environment 110 by executing a threat model generator 141 and a security threat policy manager 142, according to one embodiment.

The threat model generator 141 includes several modules or features for developing and maintaining a threat model library 143 and for determining whether new or existing applications satisfy security-related conditions set forth by the asset service provider. According to one embodiment, and as described in further detail below, the threat model generator 141 analyzes new and existing applications, e.g., the applications 123, 112, 113, 115, by automating threat model generation and pattern identification for the applications. The threat model generator 141 automates threat model generation by providing one or more adaptable and customized threat model questionnaires or templates to developers, e.g., the developer 122. The threat model generator 141 includes a threat acquisition module 144, a threat model generation engine 145, a questions bank 146, a support request module 147, and a user interface module 148, according to one embodiment.

The threat model generator 141 uses the threat acquisition module 144 to update and maintain the threat model library 143, according to one embodiment. The threat model library 143 is a database, table, or other data structure configured to organize and store security threats identified by the threat model generator 141, e.g., through the threat acquisition module 144. The threat acquisition module 144 populates the threat model library 143 with publicly identified or known security threats and with security threats that have been identified by the service provider. In one embodiment, the threat model library 143 is populated with one or more security threats identified by one or more virtual assets.

The threat acquisition module 144 populates the threat model library 143 using an external threats module 149 and a detected threats module 150, according to one embodiment. In one embodiment, the threat acquisition module 144 uses the external threats module 149 to, for example, query publicly or privately available security threat repositories or security threat databases or banks. For example, the external threats module 149 may be configured to purchase access to a security threat repository from one or more security service providers, such as the security service provider computing environment 160. The acquired list of publicly known or publicly available security threats may include names, content, characteristics, signatures, and solutions for the identified and acquired security threats. In other words, by acquiring information regarding security threats from an external source, the external threats module 149 can populate the threat model library 143 with information that is useful for identifying how security threats are used and for identifying how to protect or secure an application from security threats, according to various embodiments.

The threat acquisition module 144 uses the detected threats module 150 to populate the threat model library 143 with information regarding security threats that have been discovered or identified by the asset service provider, according to one embodiment. For example, the detected threats module 150 can be configured to receive security threat updates manually or automatically from an information security team of the service provider. In some embodiments, the information security team of the service provider monitors the assets of the asset computing environment 110 and notifies the detected threats module 150 of any new actual or potential security threats to the applications hosted by the assets or to hardware/software components of the assets, according to one embodiment. Upon receipt of newly identified, defined, or detected security threats, the detected threats module 150 can be configured to update the threat model library 143 to reflect the newly identified, defined, or detected security threats, according to one embodiment.

The threat model generator 141 uses the threat model generation engine 145 to receive security information for an application and to determine and/or indicate the sufficiency or adequacy of the security information, according to one embodiment. The threat model generation engine 145 can be configured to transmit questions from the question bank 146 to the developer 122 through the user interface module 148 to determine various characteristics of the application 123, 112, 113, or 115. In particular example, the threat model generation engine 145 can be configured to use the model inputs module 151 of the user interface module 148 to display questions and receive answers or responses from the developer 122. According to what the developer is attempting to accomplish, the questions can be directed towards the application 123 that is under development, or the questions can be directed towards the application 112, 113, or 115 that is mature and that is being modified. An example of a threat model questionnaire or template that may be generated through the user interface module 148 is discussed in more detail below and illustrated in FIG. 2. In some implementations, the characteristics of the application that are received and determined by the threat model generation engine 145 can include, but are not limited to, the capacity, speed, size, and software capabilities of an asset or computing environment upon which the application will be executed or hosted. The characteristics of the application that are determined by the threat model generation engine 145 can also include, but are not limited to, whether the application includes collection-oriented components, and whether the application has been or will be developed to be resilient to security threats such as tickling attacks, spoofing, data tampering, the denial of service, elevation of privilege, or the like.

The threat model generator 141 uses the support request module 147 and the output diagram module 152 to determine a sufficiency of security measures included in an application (e.g., application 112, 113, 115, or 123), and to indicate or report the determined sufficiency (or insufficiency) to the developer 122 or to another user, according to one embodiment. Threat model generation engine 145 uses the questions bank 146 and the model inputs module 151 to inquire as to whether security measures have been taken into to account for various types of threats such as spoofing, data tampering, denial of service, and the like. The threat model generation engine 145, through the questions from the questions bank 146, may also request that the developer 122 provide information regarding how the application is secured or protected from one or more security threats. For example, the threat model generation engine 145 may request or require that the developer 122 provide specific algorithms, pseudo-algorithms, or code to support the developer's assertion that the application is secure. The threat model generation engine 145 may communicate with the threat model library 143 to determine whether the responses received from the developer 122 match or resemble solutions to security threats that are stored in the threat model library 143. In some instances, the threat model generation engine 145 may be unable to automatically determine whether the security measures taken by the developer are adequate or to determine if the security measures resemble the measures or solutions stored in the threat model library 143. In these example situations, the threat model generation engine 145 can be configured to use the support request module 147 to automatically acquire additional support, or automatically request input, from one or more human resources, according to one embodiment.

The support request module 147 may forward one or more responses received from the developer 122 to a programmable service, securities expert, or other human resource to check, evaluate, and/or determine the adequacy of the response received from the developer 122. Some programmable services operate by posting tasks to a website that allows one of a number of users to look up an answer or provide a consultation regarding a query, for a nominal and predetermined fixed fee. Additionally and/or alternatively, the support request module 147 can be selectively configured to transmit or forward responses from the developer 122, which the threat model generation engine 145 does not recognize, to a computing security expert. For example, the asset service provider may have a pre-established relationship with one or more computer security experts and the support request module 147 may forward a response from the developer 122 to one or more computer security experts for evaluation and/or analysis. The support request module 147 may forward responses received from programmable services and computer security experts to the threat model generation engine 145 so that the threat model generation engine 145 may update the threat model library 143 to reflect the newly acquired information and to facilitate automating future responses that resemble the response from the developer 122 that triggered the operation or execution of the support request module 147.

Figure 3:
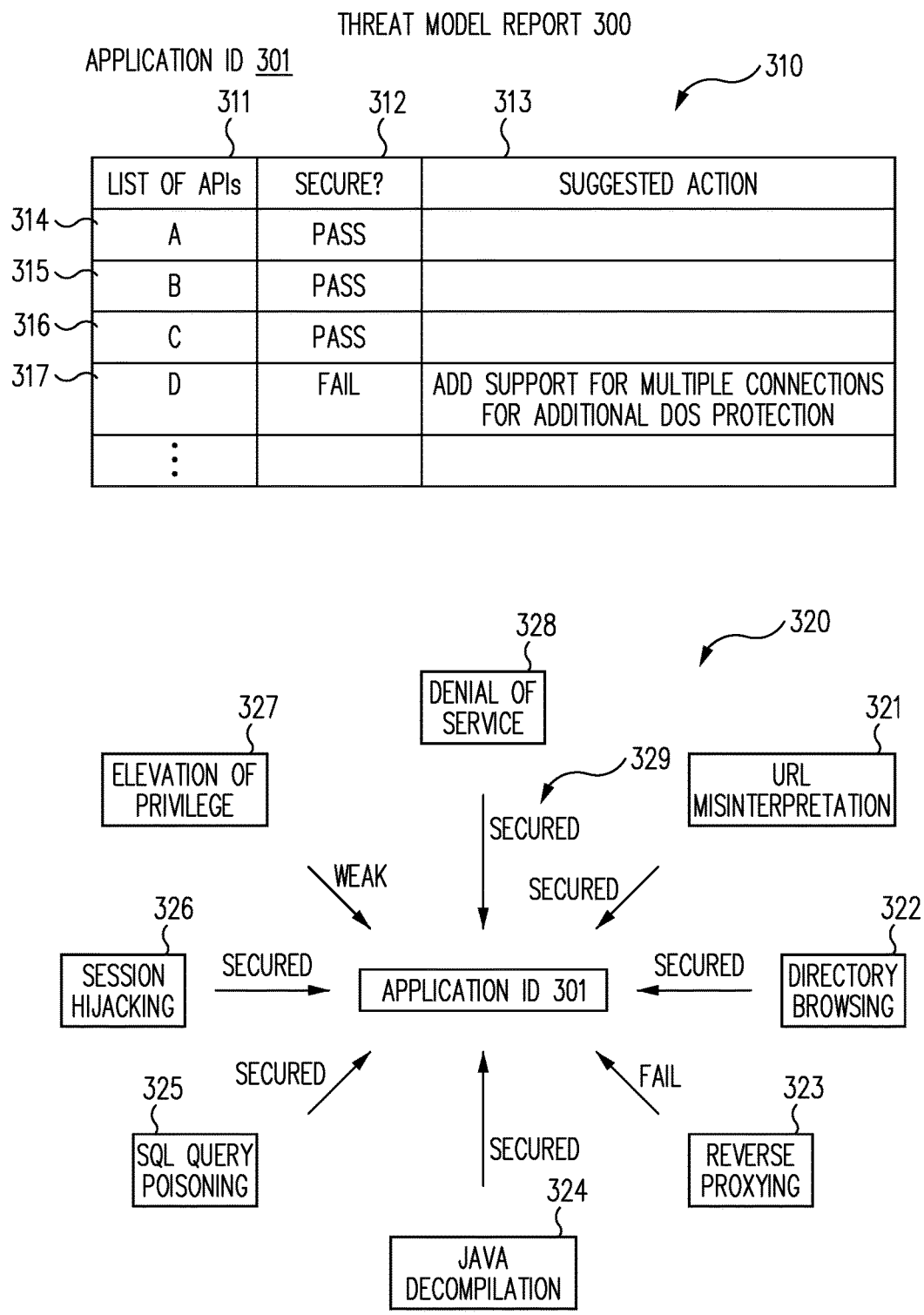
FIG. 3 is a block diagram of a user interface for providing a threat model report, in accordance with one embodiment.

The threat model generation engine 145 may use the output diagram module 152 of the user interface module 148 to identify, display, and/or generate a threat model for use by the developer 122, according to one embodiment. The output diagram module 152 may be configured to provide tables, charts, graphs, or other data structures that: identify portions or components of the application; identify security threats associated with the components of the application; and identify whether or not the application adequately or sufficiently is protected from enumerated or listed security threats. According to one embodiment, and as will be discussed in more detail below, the output diagram module 152 can be configured to generate the threat model report that is represented in FIG. 3.

The asset service provider computing environment 140 uses the security threat policy manager 142 to authorize and reject the application 123 or modifications to the application 112, 113, or 115 at least partially based on whether the applications satisfy the security threat policy 153, according to one embodiment. The security threat policy 153 can, for example, specify one or more minimum requirements that an application must satisfy in order to be hosted by an asset of the asset computing environment 110. The one or more minimum requirements include, but are not limited to, whether the application or the components of the application are individually and/or holistically protected against tickle attacks, identity spoofing, data tampering, repudiation, information disclosure, denial of service, elevation of privilege, or any other currently known or later discovered computer security threats or malicious attacks. In one embodiment, the security threat policy 153 specifies that all security threats identified by the service provider must be sufficiently secured against or addressed in the application before the service provider authorizes the insertion or injection of the application into one or more assets of the asset computing environment 110. In another embodiment, the security threat policy 153 specifies a frequency by which an already operable or asset-hosted application must be reevaluated in light of newly discovered computer security threats, e.g., quarterly, semiannually, or annually, to ensure the security of tenant information, user information, and other application hosted by the assets. In one embodiment, the security threat policy 153 can include a requirement that the developer 122 run proposed modifications to the application 112, 113, or 115 through the threat model generator 141 prior to inserting any application updates or modifications into an asset or instance of the asset computing environment 110.

The security threat policy manager 142 may use a policy analytics engine 154 to determine whether the application 112, 113, 115, or 132 satisfies the requirements of the security threat policy 153. The policy analytics engine 154 may communicate with the threat model generator 141, e.g., the threat model generation engine 145, to determine whether information received about an application from the developer 122 satisfies the requirements of the security threat policy 153. In response to the results determined by the policy analytics engine 154, the security threat policy manager 142 may approve or reject authorization for the application 123 to be inserted into one of the assets of the asset computing environment 110, according to one embodiment. According to another embodiment, in response to the results determined by the policy analytics engine 154, the security threat policy manager 142 may approve or reject authorization for modifications or updates to the application 112, 113, or 115 to be inserted into one of the assets of the asset computing environment 110.

The security threat policy manager 142 uses a policy execution engine 155 to maintain the security of the asset computing environment 110 by approving or rejecting requests to authorize the insertion of an application or modification to an application from the computing environment 120 into the assets of the asset computing environment 110, according to one embodiment. The policy execution engine 155 may be configured to continuously run the background of the asset service provider computing environment 140, or it may be configured to periodically monitor each application hosted by the asset computing environment 110 or each application for which a request has been received to insert the application into the asset computing environment 110. In one embodiment, the policy execution engine 155 periodically, e.g., daily or weekly, evaluates existing applications to verify that the applications continue to satisfy the requirements of the security threat policy 153. If the policy execution engine 155 identifies an application that fails to satisfy the requirements of the security threat policy 153, the policy execution engine 155 can notify the tenant, developer, or owner or the application and can terminate execution of the application until the deficiency is resolved, according to one embodiment.

Although the threat model generator 141 is fully described as integrated within the asset service provider computing environment 140, the threat model generator 141 may be installed or distributed in other computing environments within the production environment 100. For example, the threat model generator 141 may be a software package that is downloadable, deliverable, or installable onto the computing environment 120 for local use by the developer 122. In another embodiment, the threat model generator 141 is hosted by the asset computing environment 110 to provide application analysis and to provide threat model questionnaires and threat model reports to the developer 122 or other users, e.g., the user 131. In yet another embodiment, the security service provider computing environment 160 may host the threat model generator 141, instead of the asset service provider computing environment 140. In this embodiment, the security service provider computing environment 160 develops and hosts the threat model generator 141 for the benefit of the developer 122 and for the benefit of the assets of the asset service provider. The threat model generator 141, while hosted by the security service provider computing environment 160, can be configured to communicate with the security threat policy manager 142 and other components within the asset service provider computing environment 140, in order to provide a fully integrated threat modeling product to users, such as the tenant 121 and/or the developer 122.

User Interface

FIG. 2 illustrates a threat model questionnaire 200 used by the user interface module 148 to acquire threat model input information about the application 123 (or about modifications to the application 112, 113, or 115) from the developer 122, according to one embodiment. The threat model questionnaire 200 is a template of questions that are provided to the developer 122 to enable the threat model generator 141 to acquire additional information regarding the application that has been developed or that is under development, in addition to acquiring information regarding the type of asset the application is developed for. The threat model questionnaire 200 represents a customizable threat model template that the threat model generator 141 or the threat model generation engine 145 changes at least partially based on answers or responses received from the developer 122 to the questions provided. Although the threat model questionnaire 200 illustrates several examples of potential questions that may be provided to the developer 122, one of ordinary skill in the art will understand that the language of the questions, the types of questions, the quantity of questions, and/or the content of the questions can be adapted or altered based on: the contents of the threat model library 143; the development of the questions bank 146; and/or particular implementations of the threat model generator 141, according to various embodiments. The threat model questionnaire 200 includes a first question 210, a second question 220, a third question 230, a fourth question 240, and additional questions 250, according to one embodiment.

The first question 210 is used to acquire general information about the type of application or the subject matter of the application, according to one embodiment. Examples of application types include, but are not limited to, a survey 211, a marketplace 212, a blog 213, financial service 214, educational 215, or another user-identifiable type of application 216. Each of the illustrated types of applications can include a radio button, a check box, a selected menu, or other user interface selection tool that enables the developer 122 or other user to identify one or more types of applications.

The second question 220 is used to acquire information regarding the configuration of the asset or assets that currently host the application or that will host the application, according to one embodiment. The second question 220 can employ various techniques to enable the developer 122 to provide configuration information about a hosting asset. The second question 220 can include an asset metadata upload button 221 that enables the developer 122 to upload a file from the computing environment 120 that identifies the configuration and/or characteristics of an asset, according to one embodiment. For example, the file can include, but is not limited to, the capacity, speed, feature sets, processor generation, quantity of processors, and/or processor brand for the asset. The second question 220 can include a text box 222 to enable the developer 122 to manually enter the various information about the hardware or software configurations of the particular asset, according to one embodiment. The second question 220 can also include one or more drop-down menus 223, 224 to allow the developer 122 to select from one or more predetermined configurations that may be offered by the asset service provider, according to one embodiment. For example, drop-down menu 223 may identify service provider-defined asset categories, such as "storage optimized", "general purpose", "optimized", and/or "GPU instance". Furthermore, to describe the memory capacity, number of processors, and processor speeds, the drop-down menu 224 may identify service provider-defined sizes of assets, such as "medium", "small", "large", and/or "x-large". By providing pre-populated drop-down menus 223, 224, the threat model generator 141 can assist the developer 122 in identifying asset configurations that are available from the asset service provider for hosting the application. In some embodiments, more or less information regarding the assets is provided in the drop-down menus 223, 224, such as, processor speeds, number of processors, volatile memory capacities, non-volatile memory capacities, processor brands, processor generations, and the like.

The third question 230 can be used to acquire additional specific information about components of the application, according to one embodiment. For example, the third question 230 can include a text box 231 for the developer 122 to enter a number of application programming interfaces ("APIs"). The third question 230 can also include a drop-down menu 232 that identifies each of the API types that are used. In one implementation, the drop-down menu 232 can include one or more check boxes or other graphical user interface tools to acquire accurate API type information from the developer 122. The third question 230 can also include additional follow-up questions regarding each of the APIs, such as "for each API, is each API parameter checked for validity." For example, if one API parameter has an integer range of 0-9, the third question 230 can be used to ensure that the developer 122 ensure that the value entered for a particular parameter is within the defined or predetermined range. The third question 230 can include a menu 233 to enable the developer 122 to submit an answer to the follow-up questions.

The threat model generation engine 145 populates the threat model questionnaire 200 with a fourth question 240, according to one embodiment. The threat model generation engine 145 populates the threat model questionnaire 200 at least partially based on responses to previous questions, e.g., the first question 210 and/or the third question 230, according to one embodiment. The fourth question 240 can include a request that the developer 122 identify APIs that are specifically configured to collect information from users, according to one embodiment. To receive a response from the developer 122, the fourth question 240 can include a text box 241 or other graphical user interface information entry tools. Subsequently, the fourth question 240 can include subcategories of follow-up questions that specifically enumerate and/or identify types of security threats that the developer should be aware of and should secure the application against. As particular examples, the fourth question 240 can include follow-up questions and selection menus 242 to identify particular types of security threats the API for the application should be protected from. The follow-up questions the selection menus 242 can include questions relating to, for example, "tickle attack", "spoofing identity", "tampering with data", "repudiation", "information disclosure", "denial of service", "elevation of privilege", "password sniffing", and/or other categories or subcategories of security threats, according to various embodiments.

At least partially based on one or more of the questions 210, 220, 230, 240, the threat model generation engine 145 can populate the threat model questionnaire 200 with one or more additional questions 250. For example, the additional questions 250 can be used to request further information from the developer 122 as to how the developer 122 secures the application against the one or more security threats identified in the threat model questionnaire 200, according to one embodiment. For example, if the threat model generation engine 145 determines that one or more APIs or other components of an application are susceptible to denial of service attacks because the application appears to support an insufficient number of ports or connections, the additional questions 250 may be configured to assist the developer in identifying: if the application has an adequate number of connections, if the application is adequately sized, or if the application includes adequate features, e.g., traffic throttling. The additional questions 250 can be used to request further information from the developer 122 to identify what changes the developer intends to implement in an application, e.g., the application 112, 113, or 115, which is already hosted by an asset in the asset computing environment 110. As described above in connection with the threat model generation engine 145, the support request module 147 may utilize programmable services or other human resources, such as an information security expert, to evaluate the adequacy of security threat prevention measures proposed by the developer 122. In some instances, the programmable service or other human resource may have follow-on questions or inquiries that the support request module 147 may be configured to forward to the developer 122. In one embodiment, the threat model generation engine 145 uses the model inputs module 151 to deliver follow-on questions from programmable services or other human resources directly to the developer 122 for response. By automating security threat questions, the asset service provider can protect applications belonging to multiple tenants that are sharing a common computing environment or that are sharing assets within a common computing environment. By automating security threat questions and providing these questions to the developer, the service provider adds additional value to the services it makes available to its tenants or potential customers, which may help the service provider distinguish itself from its competition.

FIG. 3 illustrates a threat model report 300 that the asset service provider computing environment 140 provides to the developer 122, in response to various inputs received from the developer 122, according to one embodiment. In one implementation, the threat model generation engine 145 provides the threat model report 300 through the output diagram module 152 of the user interface module 148. As described above, according to one embodiment, the threat model generator 141 or the threat model generation engine 145 communicates with the security threat policy manager 142 to determine the sufficiency of security measures taken by the developer 122 in the development of the application 123. In other embodiments, the threat model generation engine 145 determines the adequacy or sufficiency of the security measures taken by the developer 122 to secure the application from security threats. After analyzing the threat model inputs received from the developer 122, the threat model generation engine 145 generates one or more tables, charts, process, or visual representations of a threat model for consideration by the developer 122.

The threat model report 300 includes an application identification ("ID") 301, a threat model table 310, and a threat model diagram 320 to enable the developer 122 or another user to quickly comprehend security weaknesses identified by the threat model generator 141, according to one embodiment. The threat model table 310 includes, but is not limited to, multiple columns and rows that identify parts of the application, the sufficiency of the security of each part of the application, and one or more recommended or suggested actions to take for insufficiently secured parts of the application. In one particular example, the threat model table 310 includes a list of APIs column 311, a security status column 312, and a suggested action column 313. The list of APIs column 311 can include each API identified by the developer 122, or can include other functional or organizational components of the application. The security status column 312 provides an indication of the analysis of the service provider computing environment 140 for the application 123. As shown, example entries in the security status column 312 include, but are not limited to, "pass", "fail", "weak", "strong", "secured", "not secured", and the like, according to various embodiments. The suggested action column 313 can be used by the asset service provider computing environment 140 to assist the developer 122 to update or modify the application to satisfy the standards or requirements set forth by the asset service provider. Each of the rows 314, 315, 316, and 317 can represent a different API or component of the application. The row 317 identifies an API "D" that has been identified as not secure under the security status column 312. Additionally, the suggested action column 313 for the API "D" includes a recommendation for adding support for multiple connections to the application to provide additional protection against denial of service attacks. While one specific suggested action and row/column configuration is illustrated, one of ordinary skill in the art will appreciate that more or less rows and columns can be used to provide a threat model table 310 to assist the developer 122 in improving the security of an application.

The threat model diagram 320 provides a graphical representation of the level of security of the application with regards to various particular security threats, according to one embodiment. The threat model diagram 320 includes the application ID 301 centrically position with respect to a number of security threats 321-328. The security threats 321-328 that are illustrated include, as examples, URL misinterpretation 321, directory browsing 322, reverse proxying 323, Java decompilation 324, SQL query poisoning 325, session hijacking 326, elevation of privilege 327, and denial of service 328. Associated with each illustrated security threat and the application are threat strength indicators 329. The threat strength indicators 329 can include, but are not limited to, "pass", "fail", "weak", "strong", "okay", "sufficient", "insufficient", "adequate", "inadequate", or the like. In some embodiments, the threat model diagram 320 is color-coordinated so that: security threats that have been sufficiently protected against are highlighted in green; security threats that have been insufficiently protected against are highlighted in red; and/or security threats that are marginally protected against are highlighted in yellow, according to one embodiment. Although the threat model diagram 320 is illustrated as having a circular shape, the threat model diagram 320 can be organized in any one of a number of different formats to relay the status and relationship of protection for the application against various security threats.

Process

Figure 4:
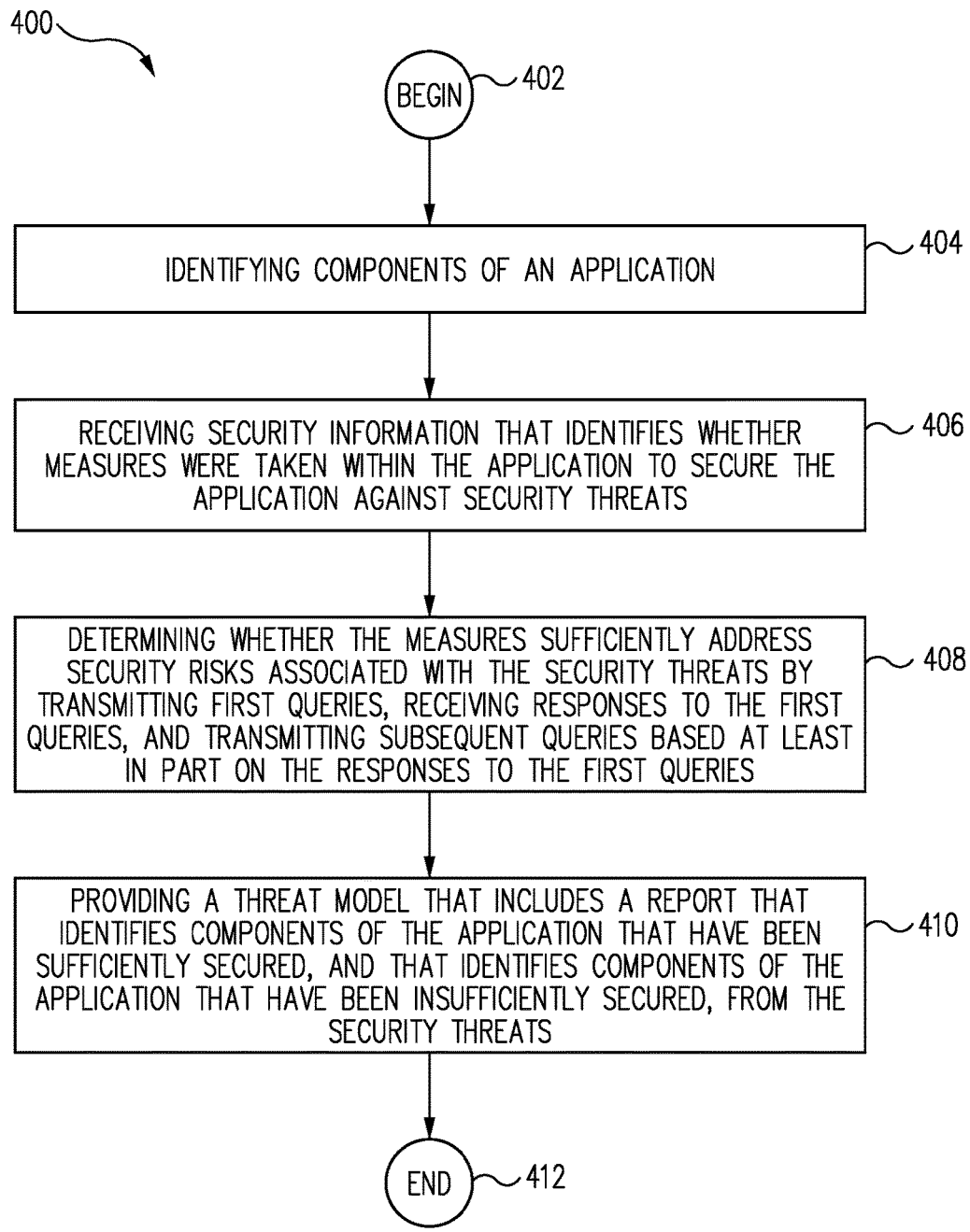
FIG. 4 is a flow diagram depicting a method for automating threat model generation and pattern identification, in accordance with one embodiment.

FIG. 4 illustrates a flow diagram of a process 400 for automating threat model generation and pattern identification for an application, according to various embodiments.

At block 402, the process 400 begins.

At block 404, a computing environment identifies components of an application, according to one embodiment. The computing environment can be an asset service provider computing environment, a security service provider computing environment, an asset computing environment, and/or a computing environment used by a developer or other user, in accordance with various implementations of the process 400. The application is an application that is under development by developer, e.g., in the planning phase, in the coding phase, and/or the testing phase, or the application is an application that has already been inserted or injected into an instance or asset provided by the asset service provider. The components of the application can include APIs, functions, modules, or other logical/functional parts of the application. In one particular embodiment, identifying components of the application includes retrieving a list or other enumeration of the components from the developer of the application through a textual or graphical user interface. In some implementations, the computing environment also retrieves characteristics of the instance or asset into which the application is or will be inserted, so that the computing environment can take additional hardware, firmware, and/or software considerations into account while analyzing the security robustness of the application.

At block 406, the computing environment receives security information that identifies whether measures were taken within the application to secure the application against security threats, according to one embodiment. The computing environment receives the security information about the application from the developer through a user interface provided by the computing environment. The security information can be as simple as "yes" and "no" responses from the developer to questions such as, "is the application secured or protected from tickle attacks?" The security information can alternatively be more complex and include specific measures, e.g., coding techniques or algorithms, employed to defeat attacks from one or more enumerated security threats.

At block 408, the computing environment determines whether the measures sufficiently address security risks associated with the security threats by transmitting first queries, receiving responses to the first queries, and transmitting subsequent queries based at least in part on the responses to the first queries, according to one embodiment. In other words, the computing environment can be configured to provide a dynamic and/or customizable series of questions to the developer that are based at least in part on information or characteristics of the application, as received from the developer. Because the user interface can be implemented using a dialog box or a webpage, in one embodiment, the computing environment can dynamically append additional questions to a threat model questionnaire or template in what would appear to the developer to be real-time.

According to various embodiments, the computing environment can use any one of a number of software modules or partitions of code to generate and/or transmit the first queries and the subsequent queries to the developer. For example, the computing environment can include a threat model generator that creates and maintains a threat model library, e.g., a database of known or discovered security threats and their corresponding resolutions. The threat model generator can also be configured to deliver or provide questions to the developer from a questions bank in order to acquire more information about the application and to more accurately characterize the features and/or components of the application. The threat model generator can transmit or provide the questions from the question bank to the developer through a user interface which may be hosted by the threat model generator or by another component within the computing environment.

The threat model generator can be configured to selectively request assistance from human resources when query responses or other information is received from the developer, according to one embodiment. For example, the threat model generator may use a support request module to forward developer responses to human resources, e.g., a programmable services provider or a security expert, to assist the threat model generator in determining whether the developer's responses are reasonable, valid, pertinent, and/or sufficient to address one or more particular security threats. In one embodiment, the threat model generator is configured to use the support request module to solicit the assistance of human resources when a developer describes a solution to a security threat that is not already recorded or included in a threat model library maintained by the computing environment.

As described above, the threat model generator can auto-populate the threat model library or coordinate human resources to populate the threat model library. For example, to auto-populate the threat model library, the threat model generator can be configured to retrieve information from an online security threats archive, database, or repository, which may be provided by one or more computing security vendors or companies. The threat model generator can coordinate human resources to populate the threat model library by enabling the computing security team of the service provider, e.g., the asset service provider or the security service provider, to add security threats and their corresponding solutions/fixes, as the security team discovers the security threats within the asset computing environment, according to one embodiment.

At block 410, the computing environment provides a threat model that includes a report that identifies components of the application that have been sufficiently secured, and identifies components of the application that have been insufficiently secured, from the security threats. The report can include one or more tables, graphs, diagrams, charts, or other visual displays or representations of: the application (or components thereof); the security threats; and the security status of the application with regard to each of the security threats, according to one embodiment. In other embodiments, the report can include a list of components of the application and suggested or recommended remedial actions for improving the security of one or more of the components against attack from one or more particular security threats. As will be understood by those of skill in the art, other implementations of the threat model may include various other combinations of the application, components of the application, indications of the level of security for the components of the application, suggested remedial actions, modifications or fixes to the application to improve its security, and/or a list of security threats to which the application may be susceptible.

At block 412, the process 400 ends.

As noted above, the specific illustrative examples discussed above are but illustrative examples of implementations of embodiments of the method or process for automating threat model generation and pattern identification for an application. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for automating threat model generation and pattern identification for an application of an asset of a service provider, comprising:
  identifying, with a first computing environment, components of the application, wherein ones of the components perform at least one of receiving, transferring, and transmitting information for the application, wherein the asset includes a second computing environment provided by the service provider and configured to make the application publically available through one or more networks;
  identifying, by at least one virtual asset of the first computing environment, one or more security threats and populating a threat model library with data regarding the identified security threats;
  receiving security information, for at least some of the components, that identifies whether measures were taken within the application to secure the application against one or more of the security threats of the threat model library, the threat model library further including one or more patterns, the patterns representing one or more first operational characteristics of the first virtual asset, wherein patterns of the threat model library are associated with at least one external event;
  determining that the measures sufficiently address security risks associated with the security threats of the threat model library, including:
  transmitting first queries to a third computing environment that are related to the security information, wherein the third computing environment is a different computing environment than the first and second computing environments;
  receiving responses from the third computing environment to the first queries related to the security information;
  transmitting subsequent queries to the third computing environment in response to and based at least in part on content of the responses to the first queries;
  receiving a second virtual asset pattern from a second virtual asset, the received second virtual asset pattern representing one or more second operational characteristics of the second virtual asset;
  identifying, by comparing the second virtual asset pattern to one or more patterns of the threat model library, at least one external event; and distributing data of the identified at least one external events to the one or more second virtual assets, if the second pattern is similar or equal to a compared pattern.

2. The method of claim 1 wherein determining whether the measures of the security information sufficiently address security risks associated with the list of security threats, further includes:
forwarding at least some of the responses from the third computing environment to the first queries to a subject matter expert or security expert to enable the subject matter expert or security expert to determine a sufficiency of the measures of the security information; and
receiving an analysis from the subject matter or security expert regarding the sufficiency of the measures of the security information.

3. The method of claim 1, further comprising:
providing a graphical user interface to receive input from the third computing environment,
further wherein identifying the components of the application includes receiving information regarding the components of the application through the graphical user interface, wherein receiving the security information, for at least some of the components, includes receiving the security information through the graphical user interface.

4. The method of claim 3 wherein providing the threat model to the third computing environment includes providing a graphical display of the threat model through the graphical user interface.

5. The method of claim 1 wherein at least some of the components are application programming interfaces (APIs) for the application.

6. The method of claim 1, further comprising:
receiving characteristics of the asset from the third computing environment through a graphical user interface;
determining security weaknesses of the asset based on the characteristics of the asset; and
providing the threat model to the third computing environment, at least partially, based on the characteristics of the asset.

7. The method of claim 6, wherein determining the security weaknesses of the asset includes querying the threat model database with the characteristics of the asset.

8. The method of claim 1 wherein determining whether the measures of the security information sufficiently address security risks associated with the list of security threats, further includes:
forwarding at least some of the responses from the third computing environment to the first queries to a programmable service; and
receiving an analysis from the programmable service regarding the sufficiency of the measures of the security information.

9. The method of claim 1 wherein determining whether the measures of the security information sufficiently address security risks associated with the list of security threats includes determining whether the security information conforms with requirements of a security policy for the asset, the security policy being managed by the service provider.

10. The method of claim 1, wherein the external events include at least one of a natural disaster, a world event, and a malicious software attack.

11. The method of claim 10, wherein the natural disaster includes one or more of a hurricane, a tornado, an earthquake, a tsunami, a typhoon, a volcano, and a flood.

12. The method of claim 10, wherein the world event includes one or more of a sporting event, an election, an act of terrorism, and a war.

13. The method of claim 10, wherein the malicious software attack includes one or more of a denial of service attack, a virus, a worm, a Trojans horse, spoofing, and pharming.

14. The method of claim 1, wherein the first and second operational characteristics include one or more types of messages received, quantities of messages received, geographic origins of messages received, frequencies of messages received, size of messages received, failed user account login attempts, processor usage percentages, denied access to a third computing environment, memory usage percentages, and network bandwidth.

15. The method of claim 1, wherein each of the one or more second virtual assets provides the one or more computing services to the one or more users,
further wherein each of the one or more second virtual assets includes a second allocation of one or more second hardware and software resources from a third computing environment.

16. The method of claim 1, wherein the first patterns are at least partially based on deviations from pre-determined operating parameters, by the one or more first virtual assets,
further wherein the second patterns are at least partially based on deviations from the pre-determined operating parameters, by the one or more second virtual assets.

17. The method of claim 1, wherein the second computing environment is a data center.

18. The method of claim 1, wherein the first patterns are detected by the one or more first virtual assets during the one of the external events.

19. A system for automating threat model generation and pattern identification for an application of an asset of a service provider, the system comprising:
at least one processor; and
at least one memory coupled to the at least one processor, the at least one memory having stored therein instructions which when executed by the at least one processors, perform a process for automating threat model generation and pattern identification for an application of an asset of a service provider, the process including:
identifying, with a first computing environment, components of the application, wherein ones of the components perform at least one of receiving, transferring, and transmitting information for the application, wherein the asset includes a second computing environment provided by the service provider and configured to make the application publically available through one or more networks;
identifying, by a virtual asset of the first computing environment, one or more security threats and populating a threat model library with data regarding the identified security threats;
receiving security information, for at least some of the components, that identifies whether measures were taken within the application to secure the application against one or more of the security threats of the threat model library, the threat model library further including one or more patterns, the patterns representing one or more first operational characteristics of the first virtual asset, wherein patterns of the threat model library are associated with at least one external event;
determining whether the measures sufficiently address security risks associated with the security threats of the threat model library, including:

transmitting first queries to a third computing environment that are related to the security information, wherein the third computing environment is a different computing environment than the first and second computing environments;

receiving responses from the third computing environment to the first queries related to the security information;

transmitting subsequent queries to the third computing environment in response to and based at least in part on content of the responses to the first queries;

receiving a second virtual asset pattern from a second virtual asset, the received second virtual asset pattern representing one or more second operational characteristics of the second virtual asset;

identifying, by comparing the second virtual asset pattern to one or more patterns of the threat model library, at least one external event; and distributing data of the identified at least one external events to the one or more second virtual assets, if the second pattern is similar or equal to a compared pattern.

20. The system of claim 19 wherein determining whether the measures of the security information sufficiently address security risks associated with the list of security threats, further includes:

forwarding at least some of the responses from the third computing environment to the first queries to a subject matter expert or security expert to enable the subject matter expert or security expert to determine a sufficiency of the measures of the security information; and receiving an analysis from the subject matter or security expert regarding the sufficiency of the measures of the security information.

21. The system of claim 19 wherein the process further comprises:

providing a graphical user interface to receive input from the third computing environment, further wherein identifying the components of the application includes receiving information regarding the components of the application through the graphical user interface, wherein receiving the security information, for at least some of the components, includes receiving the security information through the graphical user interface.

22. The system of claim 21 wherein providing the threat model to the third computing environment includes providing a graphical display of the threat model through the graphical user interface.

23. The system of claim 19 wherein at least some of the components are application programming interfaces for the application.

24. The system of claim 19 wherein determining whether the measures of the security information sufficiently address security risks associated with the list of security threats includes determining whether the security information conforms with requirements of a security policy for the asset, the security policy being managed by the service provider.

25. The system of claim 19, wherein the external events include at least one of a natural disaster, a world event, and a malicious software attack.

26. The system of claim 25, wherein the natural disaster includes one or more of a hurricane, a tornado, an earthquake, a tsunami, a typhoon, a volcano, and a flood.

27. The system of claim 25, wherein the world event includes one or more of a sporting event, an election, an act of terrorism, and a war.

28. The system of claim 25, wherein the malicious software attack includes one or more of a denial of service attack, a virus, a worm, a Trojans horse, spoofing, and pharming.

29. The system of claim 19, wherein the first and second operational characteristics include one or more types of messages received, quantities of messages received, geographic origins of messages received, frequencies of messages received, size of messages received, failed user account login attempts, processor usage percentages, denied access to a third computing environment, memory usage percentages, and network bandwidth.

30. The system of claim 19, wherein the first patterns are at least partially based on deviations from pre-determined operating parameters, by the one or more first virtual assets, further wherein the second patterns are at least partially based on deviations from the pre-determined operating parameters, by the one or more second virtual assets.

31. The system of claim 19, wherein the second computing environment is a data center.

32. The system of claim 19, wherein the first patterns are detected by the one or more first virtual assets during the one of the external events.

* * * * *